Dec. 4, 1934.    C. E. IVES    1,983,132
VARIABLE SPEED DRIVE
Filed Feb. 1, 1932
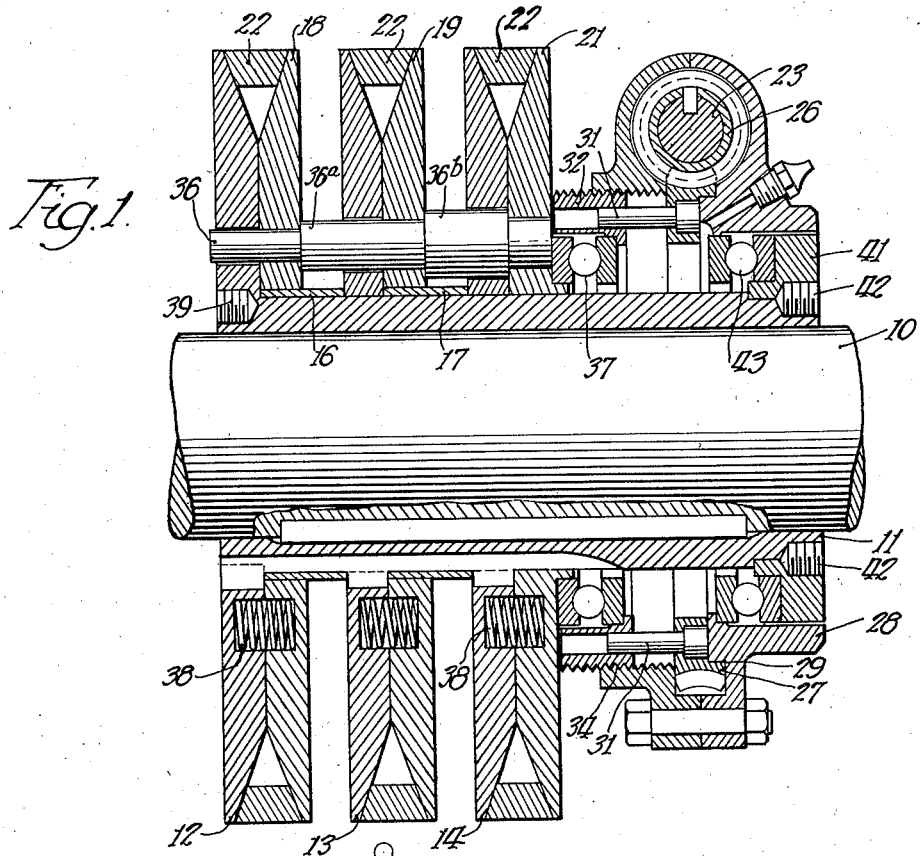
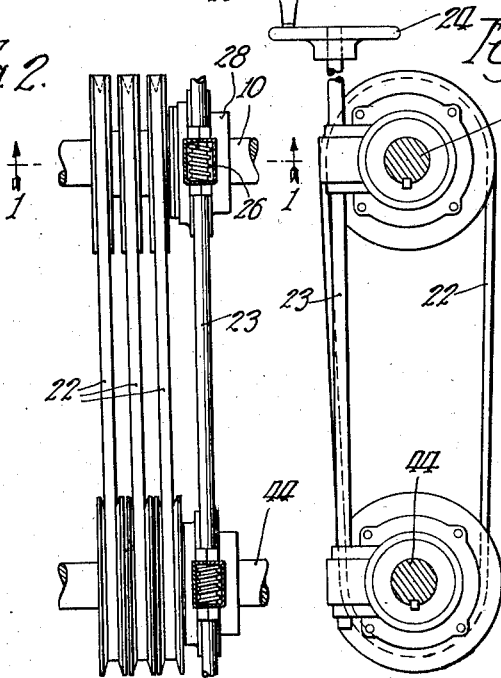
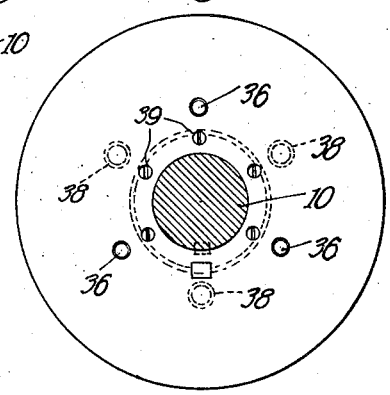
Inventor
Clifford E. Ives
By: Mueller & McLaughlin
Attys.

Patented Dec. 4, 1934

1,983,132

UNITED STATES PATENT OFFICE 1,983,132

VARIABLE SPEED DRIVE

Clifford E. Ives, Chicago, Ill.

Application February 1, 1932, Serial No. 589,991

8 Claims. (Cl. 64—8)

My invention relates to variable speed drive mechanisms.

The principal object of my invention is the provision of an improved variable speed drive.

Another object is the provision of a variable speed drive which can be made to deliver multiples of a predetermined horse power.

Another object is the provision of a variable speed belt drive which will employ a standard type of belt.

Another object is the provision of a variable speed drive of this character in which a number of belts may be employed for multiplying the horse power which may be delivered from a single belt.

Other objects and features of the invention will be apparent from a consideration of the following detailed description, wherein Fig. 1 is a sectional view showing the assembly of one of the pulley units, which may be either the driving or driven unit;

Fig. 2 is a plan view of the entire drive;

Fig. 3 is a side elevational view of the drive of Fig. 2; and

Fig. 4 is an elevational view looking at the opposite side of Fig. 3.

In general, in carrying out my invention, I employ the principles of the split pulley with a V-belt whereby by adjusting the split pulley the belt can be adjusted with respect to the center of the shaft so that the relative speed of the shaft for the same belt speed is modified directly in accordance with the distance of the belt from the center of the shaft.

In utilizing this principle, it is customary to vary the driving and driven split pulleys together so that while the speed of the belt, as determined by the drive, is either increased or decreased, the relationship between the speed of the belt and the speed of the driven shaft will also be inversely increased or decreased. This principle is old and is utilized in the well-known Reeves drive. This type of drive, however, heretofore has not been used satisfactorily with more than one belt and accordingly where greater horse power is to be delivered, it is necessary to increase the size of the belt, pulleys and the like. With this type of drive, entire standardization of parts has been impossible and, for this reason, this drive is relatively expensive, is not suitable for all conditions and usually requires considerable space.

The drive of my invention employs a number of split pulleys on both the driving and driven shaft and these pulleys are so constructed and mounted that one-half of each pulley is fixed on its shaft and the other half is adjustable longitudinally on the shaft. Adjusting means is provided whereby as one set of pulleys is adjusted to increase the effective diameter by moving the movable pulley sections along the shaft in a direction to close the space between the pulleys, the pulleys on the opposite shaft are adjusted in a reverse direction and the ratio of speed between the driving and driven shaft is correspondingly modified.

Fig. 1 is a sectional view taken along one set of pulleys which may be either the driving or the driven set. The figure shows a shaft 10, provided with a fixed sleeve 11, to which sleeve pulley sections 12, 13 and 14 are fixed. These fixed pulley sections are spaced by rings 16 and 17, disposed between them, and around the sleeve 11 adjustable pulley sections 18 and 19 are slidably supported on the rings 16 and 17, adjacent the fixed pulley sections 12 and 13. The third adjustable pulley section 21 is loosely mounted directly on the sleeve 11 adjacent the fixed pulley section 14. The outer adjacent surfaces of the respective sets of pulleys (each comprising a fixed section and a longitudinally movable section) are bevelled to provide V-shaped peripheral drive faces into which V-shaped belts 22—22 are adapted to engage.

For adjusting the pulley sections, I provide a rod 23 adapted to be turned by a hand wheel 24 (Fig. 3) and carrying a worm 26. This worm engages a relatively large worm gear 27 suitably supported with the housing 28. Any suitable bearing means may be provided for the worm gear. In the present embodiment, I show co-operating shoulders 29 on the housing and worm gear, the worm gear being held on its bearing by a portion of the housing bearing against the opposite side thereof. This is merely illustrative, however, as other means for supporting the worm gear can be employed.

The worm gear carries a plurality of pins 31 and these pins project into openings in a rotatable block 32, having threads 33 engaging with corresponding threads 34 on the inside of the housing. Rotation of the worm gear, therefore, will cause a corresponding rotation of the block 33, which will move the block either toward or away from the pulleys, and this movement of the block is utilized to adjust the relative position of the longitudinally shiftable pulley sections. For shifting the pulley sections, themselves, I provide a plurality of shifting rods 36, each having shoulders 36a and 36b for engaging against the sections 18 and 19 respectively. Intermediate the rods 36 and the block 32 is a ball bearing 37, one race of which bears against the block and the other race of which bears against the shiftable pulley section 21 and the shifting rods 36. It will be seen from this construction that while the pulley sections 18 and 19 are adjusted by the shifting rod 36, pressure is applied directly to the section 21 by the block 32 through the instrumentality of the interposed bearing.

It is evident that the mere wedging action of the belt 22 will normally be sufficient to force the pulley sections apart if the restraining action of the shifting rods is removed. However, to assist the action of the pulley itself, I provide a plurality of compression springs 38 between the pulley sections and these tend to force the pulley sections apart when the restraining effect of the shifting rods is removed.

For assembling the mechanism on the shaft, I anchor the fixed pulley section 12 to the sleeve by a plurality of threaded pins 39 which function as keys. At the opposite end of the sleeve a retaining ring 41 is secured to the shaft by similar threaded pins 42. It will be seen from this construction that the entire assembly including the retaining ring 41 and, with the exception of the adjusting mechanism, including the housing 28 and parts contained therein, rotate with the shaft 10. The bearing 37, besides functioning to transmit the movement of the block 32 to the shiftable pulley sections, also acts as a bearing between the non-moving parts and the adjacent moving parts of the mechanism. A similar bearing 43 is disposed between the stationary parts and the retaining ring 41.

It is obvious that the shaft 10 may be either the driving or driven shaft. A co-operating shaft 44 which also may be either a driving or driven shaft, carries identical mechanism as that shown in Fig. 1. The adjusting rod 23 extends between the two shafts and associated pulley carrying mechanism and so, when the rod 23 is turned to adjust one set of pulleys, it will also adjust the second set of pulleys. This is brought about by providing a right hand spiral and right hand threads on one worm and worm gear, with left hand spiral and threads on the opposite worm and worm gear. Or the same result may be obtained by running the rod 23 diagonally from one side of one pulley assembly to the opposite side of the other pulley assembly, in which case the worms and worm gears could be identical. Neither provision is shown in detail, however, since those skilled in the art will readily understand the manner in which this reverse movement of the two sets of pulleys is obtained.

While I disclose my invention in detail to permit those skilled in the art to practice the same, it is obvious that I do not restrict myself to the details described, the invention being limited only by the scope of the appended claims.

What I claim is new and desire to protect by United States Letters Patent is:—

1. In a variable speed drive, a shaft, a plurality of split pulleys on the shaft each having a part fixed on the shaft and a part movable longitudinally on the shaft, a pin extending thru the split pulleys having means engaging the movable pulley parts, and means for moving said pin to adjust the relative position of the fixed and movable pulley parts, said means including a worm, a worm gear adapted to be turned by the worm, a stationary housing supporting the worm and worm gear, and a sleeve longitudinally movable along the shaft turned by the worm gear to move the pin and all the movable pulley parts toward the fixed pulley parts.

2. In a variable speed drive, a sleeve adapted to be splined on a shaft, a plurality of split pulleys, each having a part keyed to said sleeve, and a part movable on the sleeve, a plurality of pins extending thru the split pulleys and having shoulders engaging the movable pulley parts, a housing having internal threads, a block in the housing having threads meshing with the housing threads, and means for turning said block.

3. In a variable speed drive, a sleeve adapted to be splined on a shaft, a plurality of split pulleys, each having a part keyed to said sleeve, and a part movable on the sleeve, a plurality of pins extending thru the split pulleys and having shoulders engaging the movable pulley parts, a housing having internal threads, a block in the housing having threads meshing with the housing threads, a worm gear and adjustable connection between the worm gear and block, an adjusting rod and a worm carried by adjusting rod and meshing with the worm gear whereby the turning of said rod is effective to adjust the movable pulley parts.

4. In a variable speed drive, a sleeve adapted to be splined on a shaft, a plurality of split pulleys each having a part keyed to the sleeve and a part movable on the sleeve, compression springs between the keyed and movable pulley parts, a plurality of pins projecting through all of the split pulleys and having shoulders engaging the movable pulley parts and means carried on the sleeve for adjusting the position of the pins to move said movable pulley parts, the compression springs functioning to assist the movement of the movable pulley parts away from the keyed pulley parts.

5. A variable speed drive, a sleeve adapted to be splined on a shaft, a plurality of split pulleys each having a part keyed on the sleeve and a part movable on the sleeve, annular spacing rings on the sleeve for spacing the keyed pulley parts and serving as bearing means between the movable pulley parts in the sleeve, a plurality of pins extending through all of the pulleys and having shoulders engaging the movable pulley parts, and means carried on the sleeve for moving all of said pins simultaneously for adjusting the movable pulley parts.

6. A variable speed drive, a sleeve adapted to be splined on a shaft, a plurality of split pulleys each having a part keyed on the sleeve and a part movable on the sleeve, annular spacing rings on the sleeve for spacing the keyed pulley parts and serving as bearing means between the movable pulley parts in the sleeve, a plurality of pins extending through all of the pulleys and having shoulders engaging the movable pulley parts, a housing disposed around the sleeve having internal threads, a block having threads meshing with the threads in the housing, a worm gear having a bearing in the housing, a plurality of pins carried by the worm gear and projecting loosely into longitudinally disposed openings in the block whereby turning the worm gear is effective to turn the block, a worm meshing with said worm gear and means for turning said worm.

7. A variable speed drive, a sleeve adapted to be splined on a shaft, a plurality of split pulleys each having a part keyed on the sleeve and a part movable on the sleeve, annular spacing rings on the sleeve for spacing the keyed pulley parts and serving as bearing means between the movable pulley parts in the sleeve, a plurality of pins extending through all of the pulleys and having shoulders engaging the movable pulley parts, a housing disposed around the sleeve having internal threads, a block having threads meshing with the threads in the housing, a worm gear having a bearing in the housing, a plurality of pins carried by the worm gear and projecting loosely into longitudinally disposed openings in the block whereby turning the worm gear is effective to turn the block, a worm meshing with said worm gear, means for turning said worm, a thrust bearing disposed between said pins and said threaded block, a retaining ring keyed to the sleeve near the housing, and a second bearing between said retaining ring and the housing.

8. In a variable speed drive, a shaft, a sleeve splined on said shaft, a plurality of split pulleys each having a stationary part secured to said sleeve, a plurality of small sleeve-like rings loose on said first mentioned sleeve and positioned between said stationary pulley parts, said split pulleys having movable parts carried on said sleeve-like rings, a plurality of pins extending through the split pulleys, and having shoulders engaging the movable pulley parts, and means for moving said pins longitudinally to adjust said movable pulley parts.

CLIFFORD E. IVES.